US012754776B2

(12) United States Patent
Kantamneni et al.

(10) Patent No.: US 12,754,776 B2
(45) Date of Patent: Oct. 6, 2026

(54) SYSTEMS AND METHODS FOR TRACING CLOUD SERVICE COSTS

(71) Applicant: Capital One Services, LLC, McLean, VA (US)

(72) Inventors: Manideep Kantamneni, Glen Allen, VA (US); Tariq Bhatti, Richmond, VA (US); Jayasri Chadalavada, Vienna, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 651 days.

(21) Appl. No.: 18/194,494

(22) Filed: Mar. 31, 2023

(65) Prior Publication Data

US 2024/0330072 A1 Oct. 3, 2024

(51) Int. Cl.
*G06F 9/50* (2006.01)

(52) U.S. Cl.
CPC .......... *G06F 9/5077* (2013.01); *G06F 9/5027* (2013.01); *G06F 9/5072* (2013.01); *G06F 2209/5022* (2013.01); *G06F 2209/508* (2013.01)

(58) Field of Classification Search
CPC .... G06F 9/5077; G06F 9/5027; G06F 9/5072; G06F 2209/5022; G06F 2209/508
See application file for complete search history.

(56) References Cited

U.S. PATENT DOCUMENTS

| | | | | |
|---|---|---|---|---|
| 11,063,833 | B2 | 7/2021 | Kantamneni et al. | |
| 11,240,139 | B2 * | 2/2022 | Vedam | H04L 67/10 |
| 11,487,591 | B1 * | 11/2022 | Featonby | G06F 9/45558 |
| 2016/0323377 | A1 * | 11/2016 | Einkauf | H04L 67/1031 |
| 2020/0177477 | A1 * | 6/2020 | Mahanta | H04L 67/535 |

* cited by examiner

*Primary Examiner* — Michael W Ayers
(74) *Attorney, Agent, or Firm* — TROUTMAN PEPPER LOCKE LLP; Christopher J. Forstner; John A. Morrissett

(57) ABSTRACT

Disclosed embodiments may include a system for tracing cloud service costs. The system may receive data corresponding to a first node cluster, the first node cluster indicative of a plurality of cloud services utilized by one or more users. The system may extract metrics associated with the plurality of cloud services. The system may determine a relationship between each cloud service of the plurality of cloud services based on the metrics. The system may determine one or more costs associated with the first node cluster, the one or more costs based on the relationship. The system may determine whether the first node cluster is utilized within a predetermined threshold. Responsive to determining the first node cluster is not utilized within the predetermined threshold, the system may automatically conduct one or more actions associated with the one or more costs.

20 Claims, 3 Drawing Sheets

SYSTEMS AND METHODS FOR TRACING CLOUD SERVICE COSTS

FIELD

The disclosed technology relates to systems and methods for tracing cloud service costs. Specifically, this disclosed technology relates to conducting certain actions based on determined costs and utilization of the cloud services.

BACKGROUND

Cloud providers typically offer a variety of different services through one or multiple applications that provide end-user experiences. Users may utilize one or more services within various applications, and may change service utilization over time depending on individual or business needs. Tracking usage of these various services, for example, to charge users based on their respective usage rates, can be challenging given the complexity of application lineage and the relationship between services within and/or across applications.

Accordingly, there is a need for improved systems and methods for tracing cloud service costs. Embodiments of the present disclosure are directed to this and other considerations.

SUMMARY

Disclosed embodiments may include a system for tracing cloud service costs. The system may include one or more processors, and memory in communication with the one or more processors and storing instructions that, when executed by the one or more processors, are configured to cause the system to trace cloud services. The system may receive data corresponding to a first node cluster, the first node cluster indicative of a plurality of cloud services utilized by one or more users. The system may extract metrics associated with the plurality of cloud services. The system may determine a relationship between each cloud service of the plurality of cloud services based on the metrics. The system may determine one or more costs associated with the first node cluster, the one or more costs based on the relationship. The system may determine, based on the metrics, whether the first node cluster is utilized within a predetermined threshold. Responsive to determining the first node cluster is not utilized within the predetermined threshold, the system may automatically conduct one or more actions associated with the one or more costs.

Disclosed embodiments may include a method for tracing cloud service costs. The method may include receiving data corresponding to a first node cluster, the first node cluster indicative of a plurality of cloud services utilized by one or more users. The method may include extracting metrics associated with the plurality of cloud services. The method may include determining a relationship between each cloud service of the plurality of cloud services based on the metrics. The method may include determining one or more costs associated with the first node cluster, the one or more costs based on the relationship. The system may include determining, based on the metrics, whether the first node cluster is utilized within a predetermined threshold. Responsive to determining the first node cluster is not utilized within a predetermined threshold, the method may include automatically conducting one or more actions associated with the one or more costs.

Disclosed embodiments may include a system for tracing cloud service costs. The system may include one or more processors, and memory in communication with the one or more processors and storing instructions that, when executed by the one or more processors, are configured to cause the system to trace cloud services. The system may receive data corresponding to a first node cluster, the first node cluster indicative of a plurality of cloud services utilized by one or more users. The system may determine a relationship between each cloud service of the plurality of cloud services. The system may determine whether the first node cluster is utilized within a predetermined threshold. Responsive to determining the first node cluster is not utilized within the predetermined threshold, the system may automatically conduct one or more actions.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
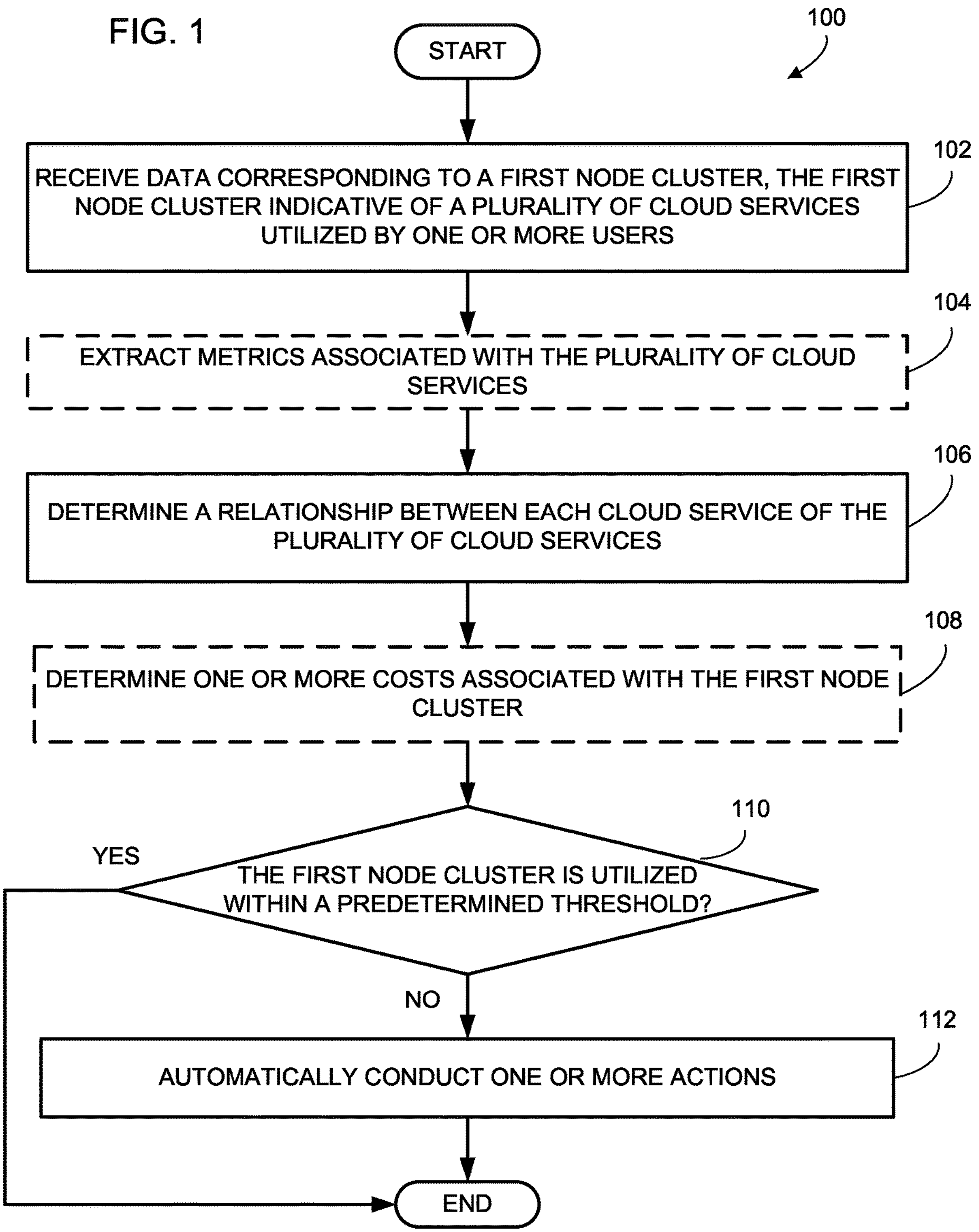
FIG. 1 is a flow diagram illustrating an exemplary method for tracing cloud service costs, in accordance with certain embodiments of the disclosed technology.

Traditional systems and methods for tracing cloud service usage and/or associated costs typically involve evaluating operation or utilization of cloud services associated with individual computing devices, or on an instance-by-instance basis. As such, traditional systems and methods for tracing cloud service costs fail to account for all computing devices or instances utilizing services within a cloud-based system, and how utilization of these services across devices or instances may impact overall system cost and efficiency.

Accordingly, examples of the present disclosure may relate to systems and methods for tracing cloud service costs. More particularly, the disclosed technology may relate to determining whether a plurality of cloud services (e.g., within an application) is under-utilized or inactive based on metrics associated with the services, and conducting certain actions responsive to determining under-utilization or inactivity.

The systems and methods described herein may improve, in some instances, the operation of computers and technology. For example, the disclosed technology may provide for receiving data and extracting metrics corresponding to a first node cluster indicative of a plurality of cloud services, determining a relationship between the cloud services contained within the plurality, determining costs associated with the cloud services, determining whether the first node cluster is utilized within a predetermined threshold, and conducting one or more actions associated with the costs based on determining the first node cluster is not utilized within a predetermined threshold. This, in some examples, may involve dynamically evaluating relationships between cloud services contained within respective node clusters, which improves the ability to trace cloud service usage and associated costs. Using a computer system configured in this way may allow the system to trace cloud service usage and associated costs across applications. This is a clear advantage and improvement over prior technologies that only evaluate utilization of cloud services on an instance-by-instance basis because this may not provide an accurate overall picture of cloud-based system cost and/or efficiency. The present disclosure solves this problem by determining a relationship between each cloud service in a plurality of cloud services (e.g., within a node cluster) to evaluate associated costs of these services. Furthermore, examples of the present disclosure may also improve the speed with which computers can trace cloud service costs and/or usage. Overall, the systems and methods disclosed have significant practical applications in the cloud service traceability field because of the noteworthy improvements of the evaluation of service cost and utilization based on service dependency and metrics, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for tracing cloud service costs, in accordance with certain embodiments of the disclosed technology. The steps of method 100 may be performed by one or more components of the system 300 (e.g., service relationship determination system 220 or web server 310 of service traceability system 308 or user device(s) 302), as described in more detail with respect to FIGS. 2 and 3. While certain blocks may be identified as being optional, certain embodiments may omit blocks even if they are not necessarily identified as being optional.

In block 102, the service relationship determination system 220 may receive data corresponding to a first node cluster, the first node cluster indicative of a plurality of cloud services utilized by one or more users (e.g., via user device(s) 302). In some embodiments, the plurality of cloud services may include Infrastructure-as-a-Service (IaaS), Platforms-as-a-Service (PaaS), and/or Software-as-a-Service (Saas). In some embodiments, the data may include information associated with access, usage, and/or operability of the cloud services. The system may be configured to receive the data in real-time as part of live tracking or monitoring of the various cloud services and applications being offered to system users (e.g., business units within an organization).

In some embodiments, the service relationship determination system 220 may access an execution log storing information related to a plurality of tasks. For example, the information stored in the execution log may include information related to one or more applications executed by the service traceability system 308 and/or user device(s) 302, such as a respective name of each task and associated sub-task executed to support the respective applications, relationship information between the tasks and associated sub-tasks, information related to the processing of the tasks and associated sub-tasks (e.g., a start time and end time of the tasks and associated sub-tasks and/or an amount of processing resources for executing the tasks and associated sub-tasks), an amount of data processed by the tasks and associated sub-tasks, a type of the tasks and associated sub-tasks, an action type of the tasks and associated sub-tasks, a network address of a respective device of the tasks and associated sub-tasks, or the like. In some embodiments, each task of the plurality of tasks may be executed by a respective user device 302 of a plurality of user devices 302 distributed across a network architecture. In some embodiments, the service relationship determination system 220 may identify a task of the plurality of tasks to obtain application layer information of the identified task, e.g., the information stored in the execution log. By accessing the execution log(s) and identifying a task, the service relationship determination system 220 may then determine which user device 302 executed a given task.

In some embodiments, after obtaining the application layer information, including a gateway address of the identified task, the service relationship determination system 220 may also determine which respective user device 302 executed the identified task to obtain network layer information of the respective user device 302. In some embodiments, the service relationship determination system 220 may use a lookup table to identify which user device executed the task based on the gateway address. In this way, the service relationship determination system 220 may identify which user device executed a given task, which may change for each instance the given task is executed.

In some embodiments, the service relationship determination system 220 may generate a dependency map illustrating a relationship between the identified task and the respective user device 302 that executed the identified task. For example, the service relationship determination system 220 may combine the application layer information and the network layer information to generate the relationship information. In some embodiments, the dependency map may also include a relationship between a task and its associated sub-tasks. To achieve this, the service relationship determination system 220 may determine which tasks and sub-tasks are associated with one another based on the information stored in the execution log. Using this dependency information, a system user may readily identify any errors due to a task failure or hardware failure that affects the performance of an application, rather than parsing through each task and/or hardware element to identify a source of the problem. As a result, the system user may dispatch any remedies to resolve the errors in a more efficient and expedited manner. In some embodiments, a user device, e.g., user device 302, may be used to display the dependency map on an interactive graphical user interface (GUI).

In optional block 104, the service relationship determination system 220 may extract metrics associated with the plurality of cloud services. In some embodiments, the metrics may include a time-ordered set of data points or variables that may provide information associated with specific operations of the cloud services. For example, the metrics may include a type of cloud service, CPU utilization, uptime or availability, memory utilization, disk utilization, latency, requests per minute, average time to acknowledge, error rate, etc.

In block 106, the service relationship determination system 220 may determine a relationship between each cloud service of the plurality of cloud services, for example, based on the metrics. In some embodiments, the determined relationship may be indicative of a dependency of a first cloud service on a second cloud service of the plurality of cloud services. A dependency may be, for example, a run-time dependency and/or an operational dependency.

In optional block 108, the service relationship determination system 220 may determine one or more costs associated with the first node cluster. In some embodiments, the cost(s) may include migration costs, operational costs, maintenance costs, and/or security costs. In some embodiments, the system may determine the associated cost(s) based on current market costs associated with the individual services contained with the first node cluster, cost(s) associated with the individual services as estimated prior to the first node cluster becoming inactive, cost(s) associated with other similar services, and/or the number of instances of the first node cluster and the number of hours the first node cluster (or one or more cloud services included within the first node cluster) is running.

In block 110, the service relationship determination system 220 may determine, for example, based on the metrics, whether the first node cluster is being utilized within a predetermined threshold. In some embodiments, the predetermined threshold may be a utilization rate, such as a percentage of time the first node cluster is being used, or a percentage of functionality of the first node cluster that is being used. For example, the system may be owned and/or operated by an organization that establishes a utilization rate for each node cluster, where each respective utilization rate may be based on the organization's estimated business value associated with each node cluster.

In block 112, responsive to determining the first node cluster is not utilized within the predetermined threshold, the service relationship determination system 220 may automatically conduct one or more actions. In some embodiments, the one or more actions may be associated with the one or more determined costs (block 108). For example, should the system determine certain node clusters (or certain services within a cluster) are not being utilized at least within the predetermined threshold, the system may be configured to conduct one or more actions to assist the system in adjusting costs and/or associated inefficiencies of the overall system due to the under-utilization of certain node clusters (or individual services).

In some embodiments, the one or more actions may include scaling the size of the system, which may be based on one or more second node clusters remaining in the system. For example, if the system determines one or more first node clusters to be inactive, as discussed above, the system may reduce the size of the system to include only those remaining and active node clusters. In some embodiments, the system may be configured to scale the size of the system automatically and/or on a periodic basis (e.g., daily) based on system inputs associated with cloud service usage.

In some embodiments, the one or more actions may include transmitting an alert to the one or more users. In some embodiments, the alert may include an indication of waste associated with the first node cluster. For example, upon determining a first node cluster to be under-utilized or inactive as discussed above, the system may be configured to transmit an alert to a system user to inform the user of such utilization or lack thereof. In some embodiments, the notification may be, for example, an email, text message, push notification, in-application alert or banner, and the like.

In some embodiments, the one or more actions may include enabling the one or more users to create a dynamic dashboard. In some embodiments, enabling the user(s) to create a dynamic dashboard may include displaying, using an interactive GUI on a respective user device associated with the one or more users, one or more selectable user input objects. The user input objects may enable a user to click on and/or filter through the various cloud services and applications associated with a global system to evaluate active versus inactive services and/or applications, and generate reports associated with any cloud waste. The user input objects may also enable a user to delete cloud services and/or applications identified as inactive or under-utilized.

In some embodiments, the one or more actions may include generating an optimized resource configuration. This optimized resource configuration may be generated based on current activity and inactivity of various services and/or applications within a global system, and may be utilized in subsequent deployments of cloud services to end users. In some embodiments, the optimized resource configuration may include instructions for providing a second plurality of cloud services to the one or more users.

Figure 2:
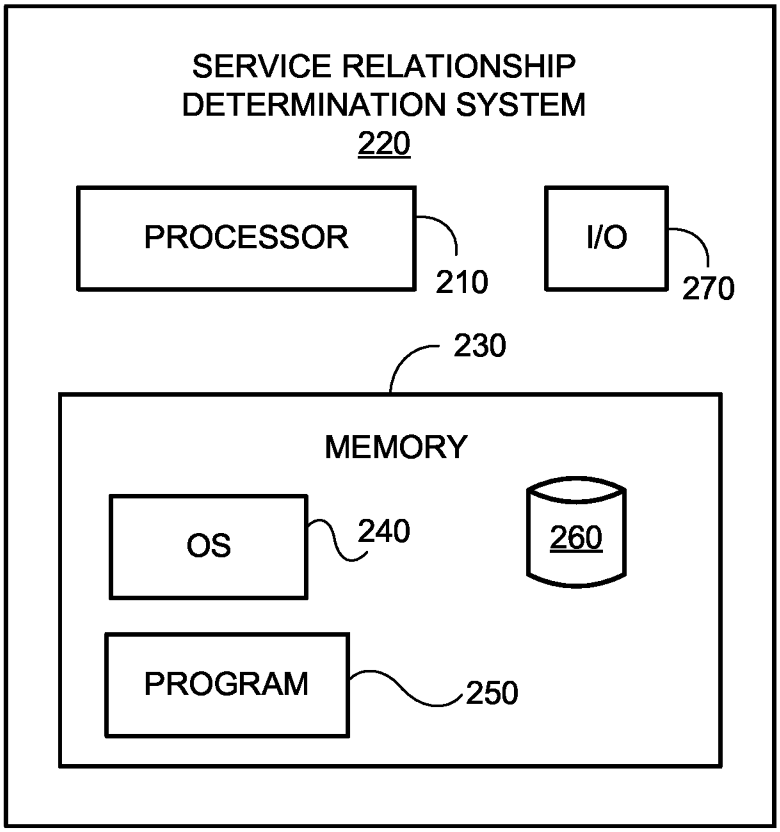
FIG. 2 is block diagram of an example service relationship determination system used for tracing cloud service costs, according to an example implementation of the disclosed technology.
Figure 3:
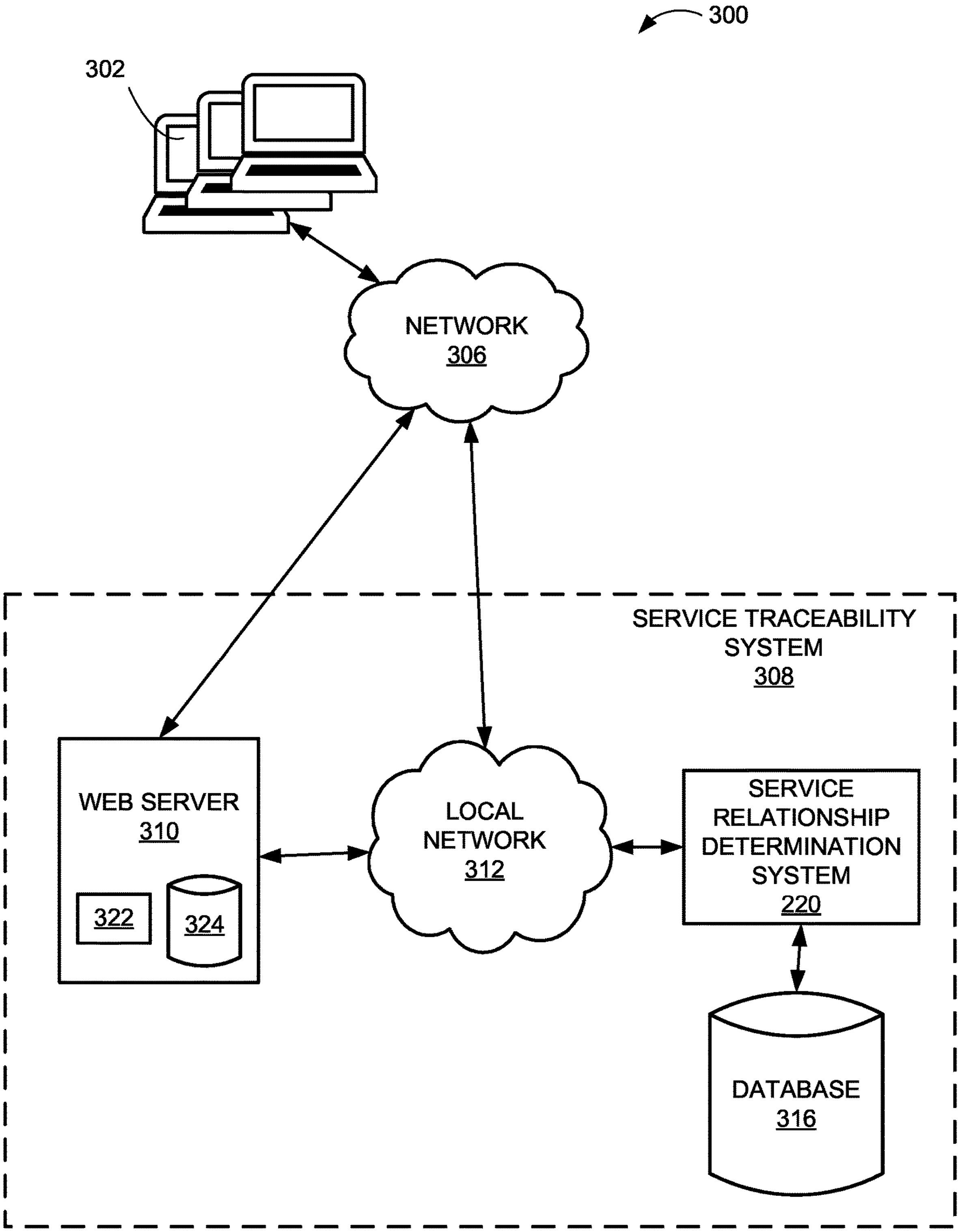
FIG. 3 is block diagram of an example system that may be used for tracing cloud service costs, according to an example implementation of the disclosed technology.

FIG. 2 is a block diagram of an example service relationship determination system 220 used to trace cloud service costs, according to an example implementation of the disclosed technology. According to some embodiments, the user device(s) 302 and web server 310, as depicted in FIG. 3 and described below, may have a similar structure and components that are similar to those described with respect to service relationship determination system 220 shown in FIG. 2. As shown, the service relationship determination system 220 may include a processor 210, an input/output (I/O) device 270, a memory 230 containing an operating system (OS) 240 and a program 250.

In certain example implementations, the service relationship determination system 220 may be a single server or may be configured as a distributed computer system including multiple servers or computers that interoperate to perform one or more of the processes and functionalities associated with the disclosed embodiments. In some embodiments service relationship determination system 220 may be one or more servers from a serverless or scaling server system. In some embodiments, the service relationship determination system 220 may further include a peripheral interface, a transceiver, a mobile network interface in communication with the processor 210, a bus configured to facilitate communication between the various components of the service relationship determination system 220, and a power source configured to power one or more components of the service relationship determination system 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 210 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 210 may be a single core processor that is configured with virtual processing technologies. In certain embodiments, the processor 210 may use logical processors to simultaneously execute and control multiple processes. The processor 210 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the service relationship determination system 220 may include one or more storage devices configured to store information used by the processor 210 (or other components) to perform certain functions related to the disclosed embodiments. In one example, the service relationship determination system 220 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The service relationship determination system 220 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the service relationship determination system 220 may include the memory 230 that may include one or more programs 250 to perform one or more functions of the disclosed embodiments. For example, in some embodiments, the service relationship determination system 220 may additionally manage dialogue and/or other interactions with the customer via a program 250.

The processor 210 may execute one or more programs 250 located remotely from the service relationship determination system 220. For example, the service relationship determination system 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a prediction system database 260 for storing related data to enable the service relationship determination system 220 to perform one or more of the processes and functionalities associated with the disclosed embodiments.

The prediction system database 260 may include stored data relating to status data (e.g., average session duration data, location data, idle time between sessions, and/or average idle time between sessions) and historical status data. According to some embodiments, the functions provided by the prediction system database 260 may also be provided by a database that is external to the service relationship determination system 220, such as the database 316 as shown in FIG. 3.

The service relationship determination system 220 may also be communicatively connected to one or more memory devices (e.g., databases) locally or through a network. The remote memory devices may be configured to store information and may be accessed and/or managed by the service relationship determination system 220. By way of example, the remote memory devices may be document management systems, Microsoft SQL database, SharePoint™ databases, Oracle™ databases, Sybase™ databases, or other relational or non-relational databases. Systems and methods consistent with disclosed embodiments, however, are not limited to separate databases or even to the use of a database.

The service relationship determination system 220 may also include one or more I/O devices 270 that may comprise one or more interfaces for receiving signals or input from devices and providing signals or output to one or more devices that allow data to be received and/or transmitted by the service relationship determination system 220. For example, the service relationship determination system 220 may include interface components, which may provide interfaces to one or more input devices, such as one or more keyboards, mouse devices, touch screens, track pads, trackballs, scroll wheels, digital cameras, microphones, sensors, and the like, that enable the service relationship determination system 220 to receive data from a user (such as, for example, via the user device(s) 302).

In examples of the disclosed technology, the service relationship determination system 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

Furthermore, the service relationship determination system 220 may include programs configured to retrieve, store, and/or analyze properties of data models and datasets. For example, service relationship determination system 220 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other MLM.

The service relationship determination system 220 may include algorithms to determine a data type, key-value pairs, row-column data structure, statistical distributions of information such as keys or values, or other property of a data schema may be configured to return a statistical profile of a dataset (e.g., using a data-profiling model). The service relationship determination system 220 may be configured to implement univariate and multivariate statistical methods. The service relationship determination system 220 may include a regression model, a Bayesian model, a statistical model, a linear discriminant analysis model, or other classification model configured to determine one or more descriptive metrics of a dataset. For example, service relationship determination system 220 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The service relationship determination system 220 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, service relationship determination system 220 may be configured to generate a similarity metric representing a measure of similarity between data in a dataset. A similarity metric may be based on a correlation, covariance matrix, a variance, a frequency of overlapping values, or other measure of statistical similarity.

The service relationship determination system 220 may be configured to generate a similarity metric based on data model output, including data model output representing a property of the data model. For example, service relationship determination system 220 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The service relationship determination system 220 may be configured to classify a dataset. Classifying a dataset may include determining whether a dataset is related to another dataset(s). Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may indicate a similarity between datasets and/or a hierarchical relationship (e.g., a data lineage, a parent-child relationship). In some embodiments, classifying a dataset may include generating graphical data, such as a node diagram, a tree diagram, or a vector diagram of datasets. Classifying a dataset may include estimating a likelihood that a dataset relates to another dataset, the likelihood being based on the similarity metric.

The service relationship determination system 220 may include one or more data classification models to classify datasets based on the data schema, statistical profile, and/or edges. A data classification model may include a convolutional neural network, a random forest model, a recurrent neural network model, a support vector machine model, or another MLM. A data classification model may be configured to classify data elements as actual data, synthetic data, related data, or any other data category. In some embodiments, service relationship determination system 220 is configured to generate and/or train a classification model to classify a dataset, consistent with disclosed embodiments.

The service relationship determination system 220 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via weighted connections. Prediction models may additionally or alternatively include classification and regression trees, or other types of models known to those skilled in the art. To generate prediction models, the prediction system may analyze information applying machine-learning methods.

While the service relationship determination system 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the service relationship determination system 220 may include a greater or lesser number of components than those illustrated.

FIG. 3 is a block diagram of an example system that may be used to view and interact with service traceability system 308, according to an example implementation of the disclosed technology. The components and arrangements shown in FIG. 3 are not intended to limit the disclosed embodiments as the components used to implement the disclosed processes and features may vary. As shown, service traceability system 308 may interact with a user device(s) 302 via a network 306. In some embodiments, the service traceability system 308 may include a local network 312, a service relationship determination system 220, a web server 310, and a database 316.

In some embodiments, a user may operate the user device(s) 302. The user device(s) 302 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 306 and ultimately communicating with one or more components of the service traceability system 308. In some embodiments, the user device(s) 302 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the service traceability system 308. According to some embodiments, the user device(s) 302 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The network 306 may be of any suitable type, including individual connections via the internet such as cellular or WiFi™ networks. In some embodiments, the network 306 may connect terminals, services, and mobile devices using direct connections such as RFID, NFC, Bluetooth™. BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 306 may include any type of computer networking arrangement used to exchange data. For example, the network 306 may be the Internet, a private data network, virtual private network (VPN) using a public network, and/or other suitable connection(s) that enable(s) components in the system 300 environment to send and receive information between the components of the system 300. The network 306 may also include a PSTN and/or a wireless network.

The service traceability system 308 may be associated with and optionally controlled by one or more entities such as a business, corporation, individual, partnership, or any other entity that provides one or more of goods, services, and consultations to individuals such as customers. In some embodiments, the service traceability system 308 may be controlled by a third party on behalf of another business, corporation, individual, partnership. The service traceability system 308 may include one or more servers and computer systems for performing one or more functions associated with products and/or services that the organization provides.

In some embodiments, the service traceability system 308 may be representative of a system arranged to provide cloud computing services such as, for example, IaaS, PaaS, Desktop as a Service (DaaS), SaaS, Storage as a Service (StaaS), Function as a Service (FaaS), Database as a Service (DBaaS), or the like. Additionally, the service traceability system 308 may also provide application developers utilizing the user device(s) 302 with tools for accelerated development, deployment, orchestration, and management of their application. For example, the service traceability system 308 may be representative of various data centers of cloud computing services providers (e.g., Microsoft® Azure®, Amazon® Web Services® (AWS®), Google® Compute Engine™, Alibaba® AliCloud®, Digital Ocean®, Vultr®, Linode®, etc.), each implementing a variety of protocols (e.g., Hyper Text Transfer Protocol (HTTP), HTTP Secure (HTTPS), etc.), standard formats (e.g., Representational State Transfer (REST), JavaScript Object Notation (JSON), Extensible markup Language (XML), Remote Procedure Call (RPC), etc.), and/or APIs (e.g., Microsoft® Services Management APIs, Amazon® Elastic Compute Cloud® (EC2®) APIs, Google® Cloud Platform (Anthos®) APIs, etc.). Additionally or alternatively, in some embodiments, service traceability system 308 may be representative of data centers internal or external to an organization that owns and/or operations user device(s) 302, the organization configured to provide cloud computing services.

In some embodiments, one or more systems within the service traceability system 308 may be geographically separated (e.g., separate physical locations, etc.) and virtually separated (e.g., separate network domains, etc.). In some embodiments, one or more systems within the service traceability system 308 may be substantially geographically co-located (e.g., in substantially the same physical location, etc.) and virtually connected (e.g., in the same network domain, etc.). Alternatively, in some embodiments, one or more systems within the service traceability system 308 may be geographically separated yet virtually connected or substantially geographically co-located yet virtually separated.

In some embodiments, the service traceability system 308 may include a scalable computing system. The scalable computing system may be arranged to provide underlying hardware and/or software infrastructure for one or more applications. The underlying hardware and/or infrastructure may typically include server devices, storage devices, networking devices, and virtualization services. For example, the scalable computing system may be arranged to include a plurality of server devices, where each server device may be configured to execute at least one virtual machine. The scalable computing system may be arranged to provision the at least one virtual machine to the plurality of server devices based at least on requests from the cloud service traceability system 308 and/or user device(s) 302. Each provisioned virtual machine may be further configured to include specialized applications, libraries, data, and/or configurations.

In some embodiments, the service traceability system 308 may further include a computing system configured to execute a plurality of applications. In some embodiments, the computing system may be arranged to execute the plurality of applications on the underlying hardware and/or software infrastructure of the scalable computing system. In some embodiments, the plurality of applications may be configured with a distributed framework (e.g., Apache® Hadoop®, Apache® Spark®, etc.) to provide one or more micro-services.

In some embodiments, the service traceability system 308 may be configured to notify a user of the user device(s) 302, an application associated with the user of the user device(s) 302, and/or a system within the service traceability system 308 regarding one or more monitored conditions that have occurred within the service traceability system 308 and/or the user device(s) 302. This in turn, would allow, for example, an administrator of the service traceability system 308 and/or the user device(s) 302 receiving such notifications to take additional actions or perform additional operations based on the occurrence of the one or more monitored conditions. In some embodiments, the service traceability system 308 may include, without limitation, one or more cloud monitoring applications.

In some embodiments, the service traceability system 308 may be configured to transmit, receive, and/or store information associated with the service traceability system 308 and user device(s) 302 as data containers in a tiered file system and/or as objects in an object storage. In some embodiments, the service traceability system 308 may include, without limitation, one or more cloud storage applications and one or more distributed cloud datastores. In some embodiments, the one or more cloud storage applications may be configured to store metrics, logs, and/or events received from the one or more systems and applications within the service traceability system 308 and/or from the user device(s) 302.

In some embodiments, the one or more cloud storage applications may be configured to store data (e.g., machine learning training data for machine learning algorithms, scientific data for scientific simulations, financial data for financial analysis, configuration data for configuring applications, etc.) associated with a user of the user device(s) 302 or an application of user device(s) 302 in one or more distributed cloud datastores. In some embodiments, to facilitate the storage and retrieval of data, the one or more cloud storage applications may be configured to receive cloud storage requests to store data within the one or more cloud datastores. In some embodiments, to facilitate the retrieval of data, the one or more cloud storage applications may be configured to receive cloud retrieval requests from systems and/or applications to retrieve data stored within the one or more cloud datastores. In response to the cloud retrieval requests, the one or more cloud storage applications may be further configured to transmit cloud retrieval responses with the requested data to the systems and/or applications based on the received cloud retrieval requests.

In some embodiments, the cloud monitoring applications may be configured to request, receive, and/or store metrics, logs, and/or events generated by the hardware and/or software of the service traceability system 308 and/or the user device(s) 302. For example, the cloud monitoring applications may access an execution log storing information related to a plurality of tasks of the applications, the cloud storage applications, and/or the user device(s) 302. For example, the information stored in the execution log may include a respective name of each of the applications, relationship information between tasks and associated sub-tasks executed to support the respective applications, information related to the processing of the tasks and associated sub-tasks (e.g., a start time and end time of the tasks and associated sub-tasks and/or an amount of processing resources for executing the tasks and associated sub-tasks), an amount of data processed by the tasks and associated sub-tasks, a type of the tasks and associated sub-tasks, an action type of the tasks and associated sub-tasks, a network address of a respective device of the tasks and associated sub-tasks, or the like. It should be understood by those of ordinary skill in the art that these are merely examples of the information stored in the execution logs, and that additional (or less) information may be stored in the execution logs.

In some embodiments, each task of the plurality of tasks may be executed by a respective user device 302 of a plurality of user devices 302 distributed across a network architecture, as discussed herein. The plurality of tasks may be related to applications on the analytics applications, cloud storage applications, and/or user device(s) 302. For example, the plurality of tasks may be an upstream lineage indicating a list of services which calls and/or consumes, for example, an application-programming interface (API) or a grouping of physical or logical components that directly support the API. Alternatively, the plurality of tasks may be a downstream lineage indicating a list of services which is being called from the API or grouping of physical or logical components that directly support the API. In some embodiments, the API may be, for example, a Representational State Transfer (REST) API, a Simple Object Access Protocol (SOAP), or the like.

In some embodiments, the user device(s) 302 may be configured to identify a task of the plurality of tasks to obtain application layer information of the identified task. For example, the application layer information may include, but is not limited to, a time stamp, a start time, an end time, a response time, a request time, a service or operation, and/or a message identification (ID). It should be understood by those of ordinary skill in the art that these are merely examples of application layer information and that other types of application layer information are further contemplated in accordance with aspects of the present disclosure. In some embodiments, the service traceability system 308 may be further configured to identify one or more sub-tasks associated with the plurality of tasks. For example, the one or more sub-tasks (i.e., secondary tasks) may be a task that supports or is related to the associated task. The secondary sub-tasks may likewise be associated with one or more tertiary tasks, and so on and so forth. In this way, the service traceability system 308 may identify each task that is executed by a given application.

In some embodiments, the service traceability system 308 may be further configured to determine which respective computing device executed the identified task or sub-task(s) to obtain network layer information of the respective computing device. For example, the user device(s) may determine which respective user device executed the identified task or sub-task(s) based on a network address, such as a gateway address, of the respective computing device. For example, the service traceability system 308 may use a lookup table to identify which user device 302 executed the task based on the gateway address. The network layer information may include, but is not limited to, memory usage of the respective computing device, processor usage of the respective computing device, a number of tasks executed by the respective computing device, information about traffic going to and from network interfaces of the computing device, or the like. It should be understood by those of ordinary skill in the art that these are merely examples of network layer information and that other types of network layer information are further contemplated in accordance with aspects of the present disclosure.

In some embodiments, the service traceability system 308 may be further configured to generate a dependency map illustrating a relationship between the identified task and the respective user device that executed the identified task. For example, the service traceability system 308 may combine the application layer information obtained from the execution log and the network layer information obtained based on the identified computing device that executed the task. Additionally, the dependency map generated by the service traceability system 308 may also include a relationship between the task and associated sub-task(s). For example, as the execution log includes relationship information between the tasks and its associated sub-tasks, the dependency map may include such relationship information. Furthermore, the service traceability system 308 may include the network layer information for each of the associated sub-task(s) and the respective user device(s) 302. For example, the service traceability system 308 may generate a dependency map illustrating a relationship between a task and its related sub-tasks. For example, the dependency map may illustrate a relationship between a first system that executed a task and its associated network resources (i.e., the application layer information and the network layer information of the task) and a second system that executed a sub-task associated with the task (i.e., the application layer information and the network layer information of the sub-task). In this way, a user may monitor which tasks are calling on each other and which user device(s) 302 in the network architecture are calling on each other. In some embodiments, the service traceability system 308 may be further configured to display, using an interactive GUI on a user device, the dependency map. For example, the dependency map may be displayed on one of the user device(s) 302.

In some embodiments, the service traceability system 308 may be further configured to monitor state information of the relationship between the identified task and the computing device that executed the identified task. The state information may include, but is not limited to, a health, a success rate, a failure rate, etc. of the task, as well as an amount of resources consumed by the computing device executing the given task. In this way, the service traceability system 308 may monitor whether the task and/or the respective computing device has incurred an error. For example, the error may be related to the execution of the task itself or it may be related to the flow traffic along the network. In some embodiments, the service traceability system 308 may be configured to update the state information on a periodic basis, e.g., daily, weekly, monthly, etc. Using this information, the service traceability system 308 may be further configured to display, on the dependency map, a task error based on the state information. In some embodiments, the service traceability system 308 may be further configured to indicate any sub-tasks affected by the task error.

Web server 310 may include a computer system configured to generate and provide one or more websites accessible to customers, as well as any other individuals involved in accessing service traceability system 308's normal operations. Web server 310 may include a computer system configured to receive communications from user device(s) 302 via for example, a mobile application, a chat program, an instant messaging program, a voice-to-text program, an SMS message, email, or any other type or format of written or electronic communication. Web server 310 may have one or more processors 322 and one or more web server databases 324, which may be any suitable repository of website data. Information stored in web server 310 may be accessed (e.g., retrieved, updated, and added to) via local network 312 and/or network 306 by one or more devices or systems of system 300. In some embodiments, web server 310 may host websites or applications that may be accessed by the user device(s) 302. For example, web server 310 may host a financial service provider website that a user device may access by providing an attempted login that is authenticated by the service relationship determination system 220. According to some embodiments, web server 310 may include software tools, similar to those described with respect to user device(s) 302 above, that may allow web server 310 to obtain network identification data from user device(s) 302. The web server may also be hosted by an online provider of website hosting, networking, cloud, or backup services, such as Microsoft Azure™ or Amazon Web Services™.

The local network 312 may include any type of computer networking arrangement used to exchange data in a localized area, such as WiFi™, Bluetooth™, Ethernet, and other suitable network connections that enable components of the service traceability system 308 to interact with one another and to connect to the network 306 for interacting with components in the system 300 environment. In some embodiments, the local network 312 may include an interface for communicating with or linking to the network 306. In other embodiments, certain components of the service traceability system 308 may communicate via the network 306, without a separate local network 306.

The service traceability system 308 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device(s) 302 may be able to access service traceability system 308 using the cloud computing environment. User device(s) 302 may be able to access service traceability system 308 using specialized software. The cloud computing environment may eliminate the need to install specialized software on user device(s) 302.

In accordance with certain example implementations of the disclosed technology, the service traceability system 308 may include one or more computer systems configured to compile data from a plurality of sources, such as the service relationship determination system 220, web server 310, and/or the database 316, for example. The service relationship determination system 220 may correlate compiled data, analyze the compiled data, arrange the compiled data, generate derived data based on the compiled data, and store the compiled and derived data in a database such as the database 316. According to some embodiments, the database 316 may be a database associated with an organization and/or a related entity that stores a variety of information relating to customers, transactions, ATM, and business operations. The database 316 may also serve as a back-up storage device and may contain data and information that is also stored on, for example, database 260, as discussed with reference to FIG. 2.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Example Use Case

The following example use case describes an example of a typical user flow pattern. This section is intended solely for explanatory purposes and not in limitation.

In one example, an organization may provide cloud services to a plurality of the organization's individual business units. The organization may be interested in tracking each business unit's respective cloud service usage and associated costs such that the organization may optimize its overall cloud services system and increase system efficiencies, such as by cutting out costs of services that are under-utilized or inactive. The organization may own and/or operate a system configured to receive data associated with each node cluster (indicative of a plurality of cloud services) within the overall cloud services system. The data may include information associated with access, usage, and/or operability of each node cluster. Based on the received data, the system may extract certain metrics associated with each node cluster, such as type of cloud service, CPU utilization, uptime or availability, memory utilization, disk utilization, latency, requests per minute, average time to acknowledge, error rate, and the like. Based on these metrics, the system may determine relationship dependencies between each node cluster, for example, run-time and/or operational dependencies. Based on the determined relationship, the system may determine one or more costs associated with each node cluster, such as operational costs, maintenance costs, security costs, etc. The system may then again use the data and/or metrics to determine whether each node cluster is being utilized within a predetermined threshold, for example, a respective utilization rate.

Responsive to determining a node cluster(s) is not being utilized within its respective predetermined threshold (e.g., the node cluster(s) is under-utilized or even completely inactive), the system may conduct one or more actions, such as ones associated with the determined costs. For example, the system may scale the size of the overall cloud services system based on the under-utilized or inactive node cluster(s), or may transmit a notification to a system user such that the system user may delete or modify certain node cluster(s).

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: receive data corresponding to a first node cluster, the first node cluster indicative of a plurality of cloud services utilized by one or more users; extract metrics associated with the plurality of cloud services; determine a relationship between each cloud service of the plurality of cloud services based on the metrics; determine one or more costs associated with the first node cluster, the one or more costs based on the relationship; determine, based on the metrics, whether the first node cluster is utilized within a predetermined threshold; responsive to determining the first node cluster is not utilized within the predetermined threshold, automatically conduct one or more actions associated with the one or more costs.

Clause 2: The system of clause 1, wherein the one or more actions comprise one or more of scaling a size of the system, transmitting an alert to the one or more users, enabling the one or more users to create a dynamic dashboard, generating an optimized resource configuration, or combinations thereof.

Clause 3: The system of clause 2, wherein scaling the size of the system is based on one or more second node clusters remaining in the system.

Clause 4: The system of clause 2, wherein the alert comprises an indication of waste associated with the first node cluster.

Clause 5: The system of clause 2, wherein enabling the one or more users to create the dynamic dashboard comprises displaying, using an interactive graphical user interface (GUI) on a respective user device associated with the one or more users, one or more selectable user input objects.

Clause 6: The system of clause 2, wherein the optimized resource configuration comprises instructions for providing a second plurality of cloud services to the one or more users.

Clause 7: The system of clause 1, wherein the plurality of cloud services comprise one or more of Infrastructure-as-a-Service (IaaS), Platforms-as-a-Service (PaaS), Software-as-a-Service (SaaS), or combinations thereof.

Clause 8: The system of clause 1, wherein the relationship is indicative of a dependency of a first cloud service on a second cloud service of the plurality of cloud services.

Clause 9: The system of clause 1, wherein the one or more costs comprise one or more of migration costs, operational costs, maintenance costs, security costs, or combinations thereof.

Clause 10: A method comprising: receiving data corresponding to a first node cluster, the first node cluster indicative of a plurality of cloud services utilized by one or more users; extracting metrics associated with the plurality of cloud services; determining a relationship between each cloud service of the plurality of cloud services based on the metrics; determining one or more costs associated with the first node cluster, the one or more costs based on the relationship; determining, based on the metrics, whether the first node cluster is utilized within a predetermined threshold; responsive to determining the first node cluster is not utilized within the predetermined threshold, automatically conducting one or more actions associated with the one or more costs.

Clause 11: The method of clause 10, wherein the one or more actions comprise one or more of scaling a size of a system, transmitting an alert to the one or more users, enabling the one or more users to create a dynamic dashboard, generating an optimized resource configuration, or combinations thereof.

Clause 12: The method of clause 11, wherein scaling the size of the system is based on one or more second node clusters remaining in the system.

Clause 13: The method of clause 11, wherein the alert comprises an indication of waste associated with the first node cluster.

Clause 14: The method of clause 11, wherein enabling the one or more users to create the dynamic dashboard comprises displaying, using an interactive graphical user interface (GUI) on a respective user device associated with the one or more users, one or more selectable user input objects.

Clause 15: The method of clause 11, wherein the optimized resource configuration comprises instructions for providing a second plurality of cloud services to the one or more users.

Clause 16: The method of clause 10, wherein the plurality of cloud services comprise one or more of Infrastructure-as-a-Service (IaaS), Platforms-as-a-Service (PaaS), Software-as-a-Service (SaaS), or combinations thereof.

Clause 17: The method of clause 10, wherein the relationship is indicative of a dependency of a first cloud service on a second cloud service of the plurality of cloud services.

Clause 18: The method of clause 10, wherein the one or more costs comprise one or more of migration costs, operational costs, maintenance costs, security costs, or combinations thereof.

Clause 19: A system comprising: one or more processors; and a memory in communication with the one or more processors and storing instructions that, when executed by the one or more processors, are configured to cause the system to: receive data corresponding to a first node cluster, the first node cluster indicative of a plurality of cloud services utilized by one or more users; determine a relationship between each cloud service of the plurality of cloud services; determine whether the first node cluster is utilized within a predetermined threshold; and responsive to determining the first node cluster is not utilized within the predetermined threshold, automatically conduct one or more actions.

Clause 20: The system of clause 19, wherein the one or more actions comprise one or more of scaling a size of the system, transmitting an alert to the one or more users, enabling the one or more users to create a dynamic dashboard, generating an optimized resource configuration, or combinations thereof.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms “component.” “module,” “system,” “server,” “processor,” “memory,” and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:

one or more processors; and a memory in communication with the one or more processors and storing instructions that, when executed by the one or more processors, are configured to cause the system to:

receive real-time data corresponding to a first node cluster, the first node cluster indicative of a plurality of cloud services live tracked and utilized by one or more users;

extract metrics associated with the plurality of cloud services;

identify, using a lookup table, a first user device associated with at least a first user of the one or more users that executed a first task associated with the plurality of cloud services based on a gateway address to obtain network layer information of the first user device;

determine a relationship between each cloud service of the plurality of cloud services based on the metrics and the network layer information;

determine one or more costs associated with the first node cluster, the one or more costs based on the relationship;

determine, based on the metrics, whether the first node cluster is utilized within a predetermined threshold;

responsive to determining the first node cluster is not utilized within the predetermined threshold, automatically scaling a size of the system based on one or more second node clusters remaining in the system; and deploying, to the one or more second node clusters, a second plurality of cloud services to the one or more users.

2. The system of claim 1, wherein the instructions, when executed by the one or more processors, are further configured to cause the system to (i) transmit an alert to the one or more users, enabling (ii) enable the one or more users to create a dynamic dashboard, (iii) generate an optimized resource configuration, or combinations thereof.

3. The system of claim 1, wherein the instructions, when executed by the one or more processors, are further configured to cause the system to enable the one or more users to create a dynamic dashboard, wherein enabling the one or more users to create the dynamic dashboard comprises displaying, using an interactive graphical user interface (GUI) on a respective user device associated with the one or more users, one or more selectable user input objects.

4. The system of claim 1, wherein the instructions, when executed by the one or more processors, are further configured to cause the system to generate an optimized resource configuration, wherein the optimized resource configuration comprises instructions for providing a second plurality of cloud services to the one or more users.

5. The system of claim 1, wherein the plurality of cloud services comprise one or more of Infrastructure-as-a-Service (IaaS), Platforms-as-a-Service (PaaS), Software-as-a-Service (SaaS), or combinations thereof.

6. The system of claim 1, wherein the relationship is indicative of a dependency of a first cloud service on a second cloud service of the plurality of cloud services.

7. The system of claim 1, wherein the one or more costs comprise one or more of migration costs, operational costs, maintenance costs, security costs, or combinations thereof.

8. The system of claim 1, wherein the instructions, when executed by the one or more processors, are further configured to cause the system to:

access an execution log storing information related to a plurality of tasks associated with the plurality of cloud services; and identify a second user device associated with at least a second user of the one or more users that executed a second task of the plurality of tasks to obtain application layer information, wherein the relationship is further based on the application layer information.

9. A method comprising:

receiving data corresponding to a first node cluster in real-time as part of live tracking of cloud services, the first node cluster indicative of a plurality of cloud services utilized by one or more users;

extracting metrics associated with the plurality of cloud services;

identifying, using a lookup table, a first user device associated with at least a first user of the one or more users that executed a first task associated with the plurality of cloud services based on a gateway address to obtain network layer information of the first user device;

determining a relationship between each cloud service of the plurality of cloud services based on the metrics and the network layer information, wherein the relationship comprises at least one of a run-time dependency and an operational dependency between a first cloud service and a second cloud service of the plurality of cloud services;

determining one or more costs associated with the first node cluster, the one or more costs based on the relationship;

determining, based on the metrics, whether the first node cluster is utilized within a predetermined threshold;

responsive to determining the first node cluster is not utilized within the predetermined threshold, automatically scaling a size of a system based on one or more second node clusters remaining in the system; and deploying, based on an optimized resource configuration generated from current activity and inactivity of the plurality of cloud services within the scaled system, a second plurality of cloud services to the one or more users via the one or more second node clusters.

10. The method of claim 9, further comprising transmitting an alert to the one or more users, enabling the one or more users to create a dynamic dashboard, generating an optimized resource configuration, or combinations thereof.

11. The method of claim 9, further comprising transmitting an alert to the one or more users, wherein the alert comprises an indication of waste associated with the first node cluster.

12. The method of claim 9, further comprising enabling the one or more users to create a dynamic dashboard, wherein enabling the one or more users to create the dynamic dashboard comprises displaying, using an interactive graphical user interface (GUI) on a respective user device associated with the one or more users, one or more selectable user input objects.

13. The method of claim 9, further comprising generating an optimized resource configuration, wherein the optimized resource configuration comprises instructions for providing a second plurality of cloud services to the one or more users.

14. The method of claim 9, wherein the plurality of cloud services comprise one or more of Infrastructure-as-a-Service (IaaS), Platforms-as-a-Service (PaaS), Software-as-a-Service (Saas), or combinations thereof.

15. The method of claim 9, wherein the one or more costs comprise one or more of migration costs, operational costs, maintenance costs, security costs, or combinations thereof.

16. A system comprising:

one or more processors; and a memory in communication with the one or more processors and storing instructions that, when executed by the one or more processors, are configured to cause the system to:

receive, in real-time, data corresponding to a first node cluster, the first node cluster indicative of a plurality of cloud services utilized by one or more users;

extract metrics associated with the plurality of cloud services, wherein the metrics comprise a time-ordered set of data points associated with the plurality of cloud services;

identify, using a lookup table, a first user device associated with at least a first user of the one or more users that executed a first task associated with the plurality of cloud services based on a gateway address to obtain network layer information of the first user device;

dynamically determine a relationship between each cloud service of the plurality of cloud services based on the network layer information, wherein the relationship comprises at least one of a run-time dependency and an operational dependency between a first cloud service and a second cloud service of the plurality of cloud services;

determine whether the first node cluster is utilized within a predetermined threshold;

responsive to determining the first node cluster is not utilized within the predetermined threshold, automatically scaling a size of the system based on one or more second node clusters remaining in the system;

generating an optimized resource configuration based on current activity and inactivity of the plurality of cloud services within the scaled system, and deploying, based on the optimized resource configuration, a second plurality of cloud services to the one or more users via the one or more second node clusters.

17. The system of claim 16, wherein the instructions, when executed by the one or more processors, are further configured to cause the system to transmit an alert to the one or more users, enable the one or more users to create a dynamic dashboard, generate an optimized resource configuration, or combinations thereof.

18. The system of claim 8, wherein the instructions, when executed by the one or more processors, are further configured to cause the system to:

generate a dependency map illustrating a respective relationship between the (i) first user device and the first task, and (ii) the second user device and the second task by combining the application layer information and the network layer information; and cause a third user device to display the dependency map on an interactive graphical user interface (GUI).

19. The system of claim 18, wherein the instructions, when executed by the one or more processors, are further configured to cause the system to monitor state information of the relationship between the first task and the first user device, the state information comprising at least one of a health, a success rate, a failure rate, or an amount of resources consumed by the first user device.

20. The system of claim 19, wherein the instructions, when executed by the one or more processors, are further configured to cause the system to display, on the dependency map, a task error based on the state information, and indicate one or more sub-tasks affected by the task error.

* * * * *